United States Patent [19]

Kanamaru et al.

[11] Patent Number: 5,028,148
[45] Date of Patent: Jul. 2, 1991

[54] SLIDE BEARING DEVICE

[75] Inventors: Hisanobu Kanamaru, Katsuta; Katsuyoshi Terakado, Ibaraki; Shin Onose, Katsuta, all of Japan

[73] Assignee: Hitachi, Ltd., Tokyo, Japan

[21] Appl. No.: 505,588

[22] Filed: Apr. 6, 1990

[30] Foreign Application Priority Data

Apr. 10, 1989 [JP] Japan .................................. 1-087935

[51] Int. Cl.$^5$ ...................... F16C 29/02; F16C 32/06; F16C 33/10
[52] U.S. Cl. ........................................ 384/12; 384/13; 384/100; 384/279; 384/902
[58] Field of Search ............ 384/12, 13, 100, 107–124, 384/129, 279, 283, 286, 287, 289, 290–293, 368–371, 902

[56] References Cited

U.S. PATENT DOCUMENTS

| | | | |
|---|---|---|---|
| 2,086,787 | 7/1937 | Whiteley | 384/902 X |
| 2,894,792 | 7/1959 | Brilli | 384/279 |
| 3,046,068 | 7/1962 | Sternlicht | 384/279 |
| 3,352,612 | 11/1967 | Eudier | 384/279 |
| 4,290,655 | 9/1981 | Apuzzo et al. | 384/902 |
| 4,715,731 | 12/1987 | Tittizer | 384/100 |
| 4,838,710 | 6/1989 | Ohta et al. | 384/100 |

FOREIGN PATENT DOCUMENTS

140044 10/1979 Japan .

*Primary Examiner*—Thomas R. Hannon
*Attorney, Agent, or Firm*—Antonelli, Terry, Stout & Kraus

[57] ABSTRACT

A slide bearing device having an oil-containing sintered member and a fixed pad fixed to the sintered member and supporting a sliding member through a film of a lubricating oil supplied from the sintered member, wherein a dynamic pressure of the lubricating oil is generated so as to forcibly form and maintain the oil film between the fixed pad and the sliding member.

21 Claims, 8 Drawing Sheets

SLIDE BEARING DEVICE

BACKGROUND OF THE INVENTION

The present invention relates to an improved lubricating mechanism for a slide bearing.

Japanese Patent Unexamined Publication No. 54-140044 discloses a self-lubricating slide bearing which has a cylindrical sleeve made of an oil-containing sintered alloy and a perforated cylindrical bearing metal member made of a rolled alloy and tightly fitted in the sleeve of the sintered alloy. During operation, lubricating oil contained in the sintered alloy is thermally expanded to exude through the perforations of the bearing metal member so as to form an oil film between the surface of the bearing metal member and a shaft on this member.

Japanese Patent Unexamined Publication No. 54-159544 discloses another type of self-lubricating bearing in which inner peripheral portion of the sintered alloy is partially sized to reduce the rate of permeation of the oil, so as to enable the lubricating oil to be circulated in the direction of the pressure difference.

The self-lubricating slide bearing disclosed in Japanese Patent Unexamined Publication No. 54-140044, however, is not arranged to enable an oil film to be formed and maintained between the shaft and the bearing metal member in a manner to correspond to the speed of rotation of the rotary shaft. Therefore, this known self-lubricating slide bearing could not satisfactorily operate as a high-speed bearing, and troubles such as shortage of lubricating oil has been often encountered.

On the other hand, in the other type of known self-lubricating slide bearing, the shaft is supported in a floating manner by the film of lubricating oil. However, since the oil film is not formed by a dynamic pressure, the lubricating function is insufficient for enabling the bearing to be used as a high-speed slide bearing.

SUMMARY OF THE INVENTION

Accordingly, a first object of the present invention is to provide a slide bearing device which can easily form an oil film between two sliding parts without fail.

A second object of the present invention is to provide a cylindrical slide bearing device which is superior both in lubrication performance and production efficiency.

A third object of the present invention is to provide a planar slide bearing device which is superior both in lubrication performance and production efficiency.

In order to attain the first object mentioned above, the present invention provides a slide bearing device having an oil-containing sintered member and at least one fixed pad fixed to the oil-containing sintered member, the pad supporting a sliding member through an oil film formed therebetween by a lubricating oil supplied from the oil-containing sintered member, with the bearing device comprising means for generating a dynamic pressure of the lubricating oil between the fixed pad and the sliding member so as to forcibly form and maintain the oil film between the fixed pad and the sliding member.

In order to attain the second object mentioned above, the present invention provides a slide bearing device having a cylindrical oil-containing sintered member and at least one fixed pad fixed to the oil-containing sintered member, with the pad supporting a rotational shaft through an oil film formed therebetween by a lubricating oil supplied from the oil-containing sintered member. The bearing device includes at least one oil-supplying port formed in the fixed pad, with and a tapered region formed on the fixed pad so as to lead from the edge of the oil-supporting port in such a manner that the pressure of the lubricating oil supplied through the oil-supplying port progressively increases as the lubricating oil moves in the direction of rotation of the rotational shaft away from the oil-supplying port.

In order to attain a third object of the present invention, the present invention provides a slide bearing device having a disk-shaped oil-containing sintered member and at least one fixed pad fixed to the oil-containing sintered member. The pad supporting a sliding member through an oil film formed therebetween by a lubricating oil supplied from the oil-containing sintered member. The bearing device includes at least one oil-supplying port formed in the fixed pad, with and a tapered region formed on the fixed pad so as to lead from the edge of the oil-supporting port in such a manner that the pressure of the lubricating oil supplied through the oil-supplying port progressively increases as the lubricating oil moves in the direction of movement of the sliding member away from the oil-supplying port.

The fixed pad is tapered with respect to the oil-containing sintered member. Therefore, the oil exuding from the oil-containing bearing produces a dynamic pressure which acts between two sliding parts. In addition, the minute gap between the oil-containing sintered alloy member and the part sliding thereon causes a capillary action to suction the oil from the oil-containing sintered alloy member.

Thus, in the slide bearing of the present invention, oil film is formed between the fixed pad and the sliding part by a dynamic pressure of the oil formed therebetween. Thus, the oil film is formed promptly and securely in a manner to correspond to the speed of rotation of the sliding member on the bearing, whereby troubles such as shortage of the oil can be eliminated.

It is thus possible to easily and securely obtain a radial slide bearing, thereby contributing to an improvement in the production efficiency, by virtue of the taper provided near the oil supply port.

It is also possible to obtain, easily and securely, a thrust-type slide bearing of a low cost, due to the provision of the tapered portion formed near the oil supply port.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
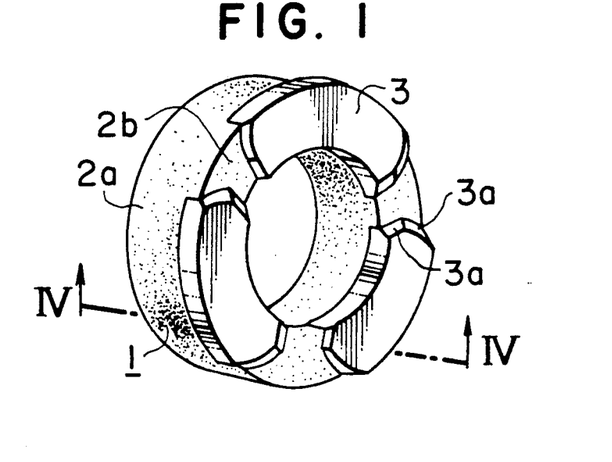
FIG. 1 is a perspective view of a first embodiment of the slide bearing device of the present invention.
Figure 2:
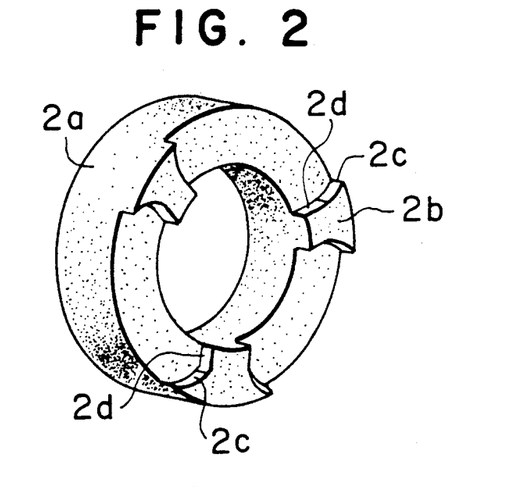
FIGS. 2 and 3 are perspective views of components of the embodiment shown in FIG. 1.
Figure 3:
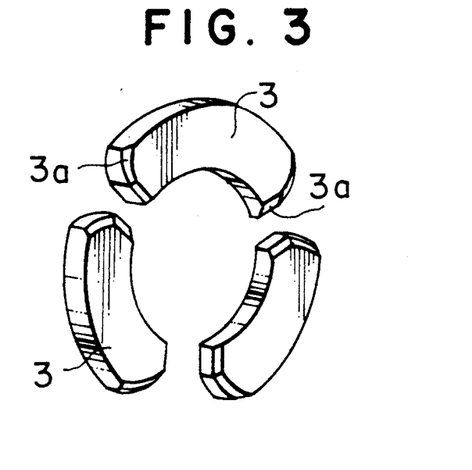

In the first embodiment of FIGS. 1 to 3, a thrust slide bearing assembly generally denoted by 1 has a disk-shaped oil-containing sintered member 2a and a plurality of fixed pads 3 each of which provides a bearing slide surface. The oil-containing sintered member 2a is made of a ferrous sintered alloy and is vacuum-impregnated with lubricating oil in an amount of 18%. The fixed pad 3 has to be made of a material having superior anti-wear characteristic. In this embodiment, the fixed pad is made of a quenched material of JIS SKD-11 (HkC60). Three such fixed pads 3, each having an arcuate form, are arranged on and fixed by an adhesive to the oil-containing sintered member in such a manner that they do not move in the circumferential direction. These fixed pads 3 are located and held by protrusions 2b of the sintered member 2a protruding from positions between adjacent pads. Each protrusion has a sector-shape with radially outer portion 2c serving to prevent radially inward projection of the pad, while radially inner portion of the same serving to prevent the pad 3 from moving in the circumferential direction.

Figure 4:
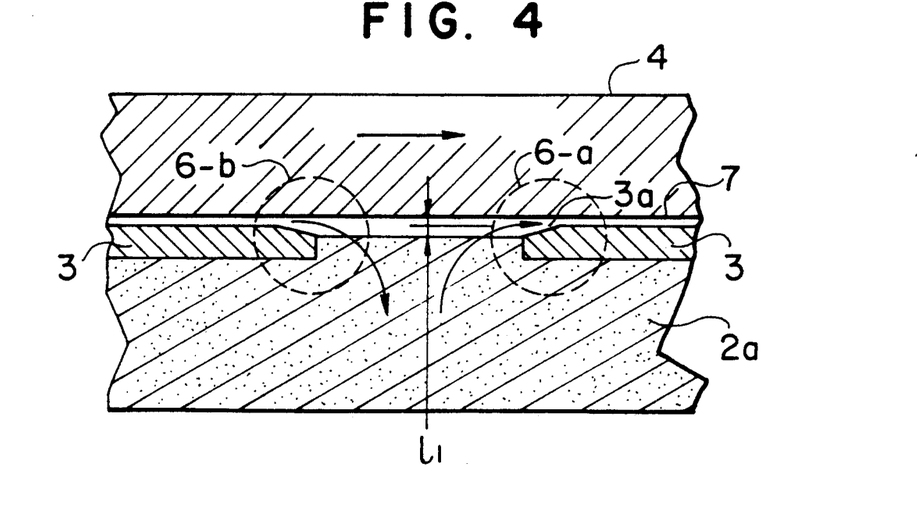
FIG. 4 is an enlarged sectional view taken along the line IV—IV of FIG. 1.
Figure 18:
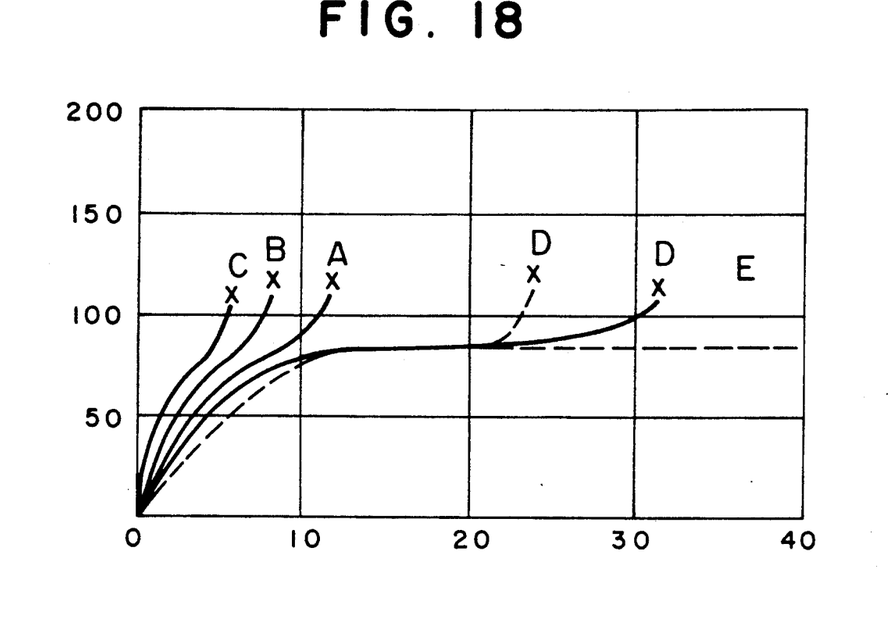
FIG. 18 is a diagram showing the performance of the apparatus of the present invention in comparison with that of the known apparatus.

The slide bearing assembly 1 of FIGS. 1-3 has an outside diameter of about 80 mm, an inside diameter of 50 mm and a thickness of 10 mm. The pads 3 have a thickness of 1.5 mm and are arranged at an interval of 5 mm. The height $l_1$ of the step between the surface of the fixed pad 3 and the surface of the oil-containing sintered member 2a is 0.04 mm. Both circumferential end surfaces of the pad 3 are tapered at 2°. The effect produced by the taper of both end surfaces of the pad, as well as the lubrication effect produced in this bearing, will be explained with specific reference to FIG. 4. Each tapered end surface of the fixed pad 3 provides, between the exposed portion of the oil-containing sintered member 2a and the sliding surface of the fixed pad, a tapered region 3a for forming an oil film. When a sliding member such as a rotary shaft is mounted in this thrust bearing assembly 1, the minute gap formed between the oil-containing sintered member 2a and the sliding member 4 produces a capillary effect so that the lubricating oil exudes from the oil-containing sliding member 2a and is forced to move in the direction of movement of the sliding member 4. In the illustrated case, therefore, a region encircled by a circle 6-a in FIG. 4 serves as an oil introducing portion, while a portion encircled by a circle 6-b serves as an oil collecting portion. The lubricating oil introduced through the introducing portion 6-a along the tapered region 3a moved onto the sliding surface so as to form an oil film 7 thereon. This oil film 7 is forcibly formed as a result of generation of a dynamic pressure produced in the oil due to the presence of the tapered region 3a, so that the oil film is always maintained between the sliding member 4 and the fixed pad 3, thus diminishing occurrence of seizure, scuffing and other troubles. The lubricating oil which has formed the oil film and relieved at the oil collecting portion 6-b is absorbed again into the sintered member 2a. Thus, the oil introducing portion 6-a and the oil collecting portion 6-b in cooperation provides an oil pumping mechanism. The rate of supply of the oil from the oil-containing bearing 2a to the tapered region 3a increases as the sliding speed, contact pressure and/or the temperature of the sliding surfaces is increased, so that the dynamic pressure raised correspondingly to promote the generation of the oil film. This also causes the rate of collection of the oil to be increased, with the result that the oil pumping action is enhanced to ensure higher durability of the bearing. The pumping action may take place only one local section of the bearing. Obviously, however, it is preferred that such a pumping effect takes place at a plurality of sections of the bearing, in order to obtain a good balance of the bearing in terms of load distribution. In this embodiment, each of three fixed pads 3 produce this pumping effect, so that the pumping effect is produced at three equi-circumferentially spaced portions in the bearing. An anti-wear test was conducted with this thrust slide bearing, using, as the sliding member, a plate having an outside diameter of 80 mm and a thickness of 15 mm and made of an alumite-treated aluminum alloy JIS A 2017. The sliding member 4 was rotated at 2000 rpm while the bearing 1 was kept stationary, under two stages of load: namely, 10 kgf and 20 kgf. A test also was conducted on comparison bearings which were respectively made of conventional solid lubricant materials such as gun-metal-containing PTFE, ETFE and carbon-fiber-containing PTFE, formed in a sheet of 1 mm thick and adhered to the surface of the rotary Al plate by an adhesive for Tefron. The temperature rise in each bearing was measured by beams of a thermo-couple embedded in the vicinity of the sliding surface of the stationary side, i.e., under the sliding surface of the bearing, The anti-friction and wear characteristic was evaluated through analysis of the relationship between the time elapsed and the temperature change, as well as visual check of the friction surfaces. The test was conducted by supplying a lubricating oil for the purpose of smooth running-in, before the rotation is commenced, but the supply of the oil was not conducted after the start of the rotation. The results of the measurement are shown in FIG. 18. Curves A, B and C show characteristics as observed with the known bearing materials: namely, the gun-metal-containing PTFE, ETFE and carbon-fiber-containing PTFE, respectively. A curve D shows characteristics as observed with a known bearing made of an Fe-type sintered member vacuum-impregnated with 18% of lubricating oil. A curve E shows the characteristic exhibited by the bearing of the present invention. Curves of solid line show the characteristics observed under the load of 12 kgf, while broken-line curves show the characteristics as obtained under the load of 20 kgf. From FIG. 18, it is understood that the slide bearing of the invention is superior in durability. Namely, the bearings made of known materials such as the gun-metal-containing PTFE, ETFE and carbon-fiber-containing PTFE, all of which have been considered as excellent solid lubricant, showed rapid temperature rise up to 100° C. or higher in quite a short time after the start of rotation, even at the lower level of the load, i.e., 10 kgf. These known solid lubricants, though they exhibit low levels of coefficient of friction, showed large rates of heat generation at high sliding speed under high contact pressure. The sliding surfaces of the bearings made of these solid lubricants showed scuffing when examined after the test. The conventional bearing made of Fe-type sintered material impregnated with lubrication oil, known as sintered metal, exhibited smaller heat generation than the bearings of the solid lubricants, by virtue of the supply of the lubricating oil exuding from the sintered material, as will be understood from the comparison of the curve D with curves A, B and C. This bearing, however, showed generation of a large quantity of metal dust when the rotation time exceeded 30 minutes even at the lower load level of 10 kgf, and scuffing was observed in the sliding surfaces, due to direct contact of the sintered material with the sliding member.

In contrast, in the slide bearing of the present invention, the temperature rise was saturated at about 80° C. both at the load levels of 10 and 20 kgf, even after 60-minute rotation. In addition, the sliding noise level was very low and substantially no generation of metal dust was observed both on the stationary and moving sliding surfaces when examined after the test. This remarkable effect is due to the constant formation of the oil film on the sliding surface of the bearing, and proves that the pumping effect is produced as expected. Tests were also conducted by using, in place of the bearing of the embodiment, a bearing made of a Cu-type oil-containing sintered material. This bearing showed a large quantity of metal dust generated during the test and a seizure was caused after the test under the heavier load of 20 kgf. Also tested were a bearing having an Ni-plated sliding surface, a bearing having a hard-Cr-plated sliding surface and a bearing having a sliding surface presented by an S 45 C quenched material (HcK 55). In these bearings, the oil films expired after the test, and scuffing was caused with generation of abnormal noise.

Figure 5:
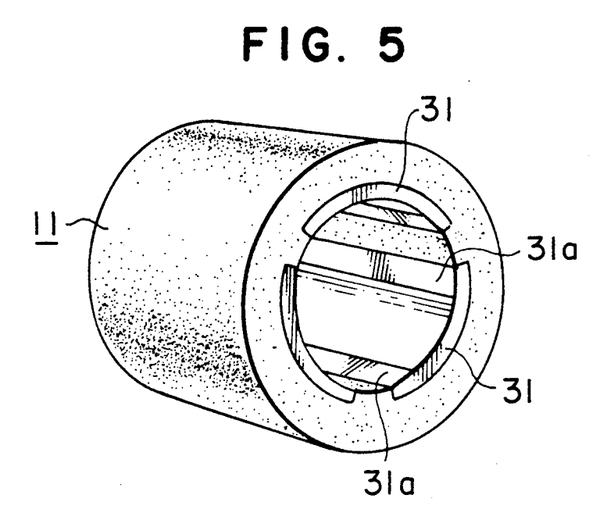
FIG. 5 is a perspective view of a second embodiment.
Figure 6A:
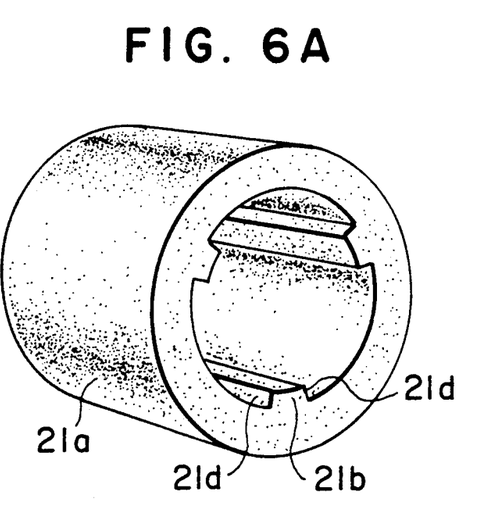
FIGS. 6(A) and 6(B) are exploded perspective views of the second embodiment.
Figure 6B:
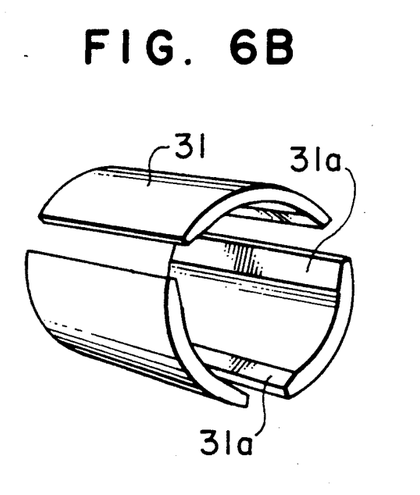
Figure 7:
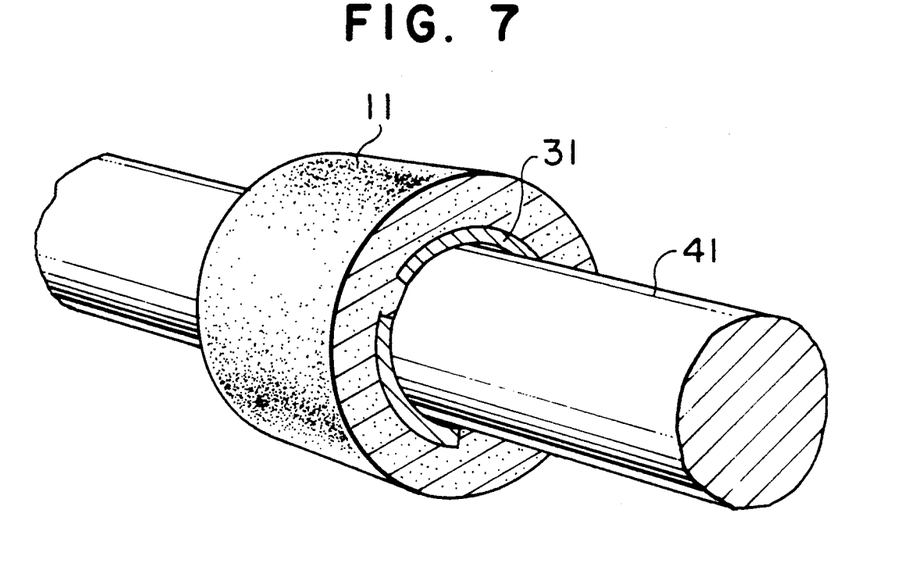
FIG. 7 is a perspective view of a practical example of the second embodiment.
Figure 8:
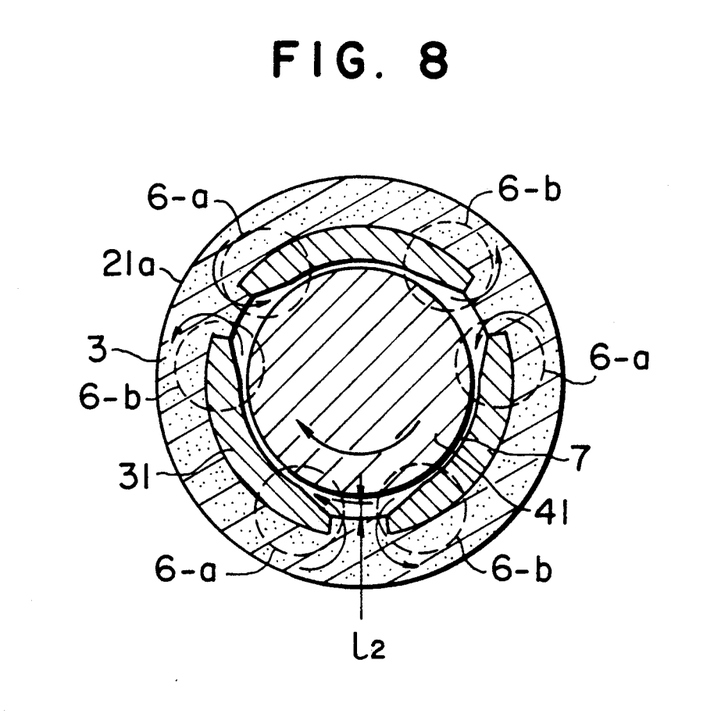
FIG. 8 is a sectional view of a critical portion of the example shown in FIG. 7.

FIGS. 5, 6A and 6B show a radial bearing as another embodiment of the present invention. The principle of this bearing is materially the same as that of the thrust bearing of the first embodiment. Referring to these figures, the radial bearing has a cylindrical oil-containing sintered member 21a and three arcuate fixed pads 31. FIG. 7 shows the manner in which a rotary shaft 41 is carried by this radial bearing, while FIG. 8 shows in cross-section the radial bearing with the rotary shaft 41 carried thereon. In this radial bearing, an oil film is formed and an oil pumping action take place by the same mechanisms as those explained before in connection with the thrust bearing shown in FIG. 4, although the formation of the oil film and the generation of pumping action take place on the inner peripheral surface of the bearing unlike the thrust bearing of FIG. 4 in which the generation of oil film and pumping action take place on a flat surface. Namely, the minute gap of a size $l_2$ formed between the rotary shaft 41 as the sliding member and the oil-containing sintered member 21 produces a capillary effect so as to suction lubricant oil from the sintered member 21a. The thus suctioned oil is forcibly supplied into the sliding area along the tapered region 31a of the pad and through the oil introducing portion 6-a, whereby a dynamic pressure is produced to form an oil film. The oil film after the formation of the oil film is then collected through the oil collecting portion 6-b and is returned to the oil-containing sintered member 21a, thus realizing the pumping action mentioned before.

The radial bearing of this embodiment was actually mounted on a starter for an automotive engine and was subjected to a durability test in which the starter was operated repeatedly. Conventionally, starters for automotive engines employ ball bearings, in order to withstand vibration and in order to provide high durability and reliability. The radial bearing in accordance with the present invention was assembled from an oil-containing sintered member 2b which was a Cu-type sintered member vacuum-impregnated with about 20% of a lubricating oil, and fixed pads 31 made of alumina ceramics. The shaft of the starter was made of a material JIS SCM 415 gas-carburized to exhibit a surface hardness of HRC 55. The thickness of effective hardened surface layer of the shaft was 0.6 mm. The radial bearing had an outside diameter of 52 mm, an inside diameter of 30 mm and a width of 10 mm. The height difference $l_2$ between the surface of the oil-containing sintered member 21a and the fixed pads 31 was 0.03 mm. The construction of this bearing was substantially the same as that shown in FIG. 5. Namely, three pads 31 are press-fitted and fixed to three portions of the oil-containing sintered member 21. With this arrangement, generation of the dynamic pressure and the pumping effect are produced at three portions in the bearing. This radial bearing was press-fitted and mounted in a starter case in place of the conventionally used high-precision ball bearing, and the starter thus assembled was tested by repeated start and stop of the starter for the purpose of examination of the durability. No abnormality of the starter was found even after 20,000 cycles of start and stop operation which was the initial criterion for the evaluation. The starter was therefor subjected to total 60,000 cycles of start and stop operation and was then disassembled to enable check of the internal parts. As a result, it was found that the lubricating oil was sufficiently distributed over the entire sliding surfaces, and no damage nor metal dust due to wear was found both in the sliding surfaces of the fixed pads 31 and in the sliding surface of the rotary shaft 41. It was thus confirmed that the bearing according to the invention is superior in wear resistance even when compared with the conventionally-used high-precision ball bearings, thus proving high utility.

Figure 19:
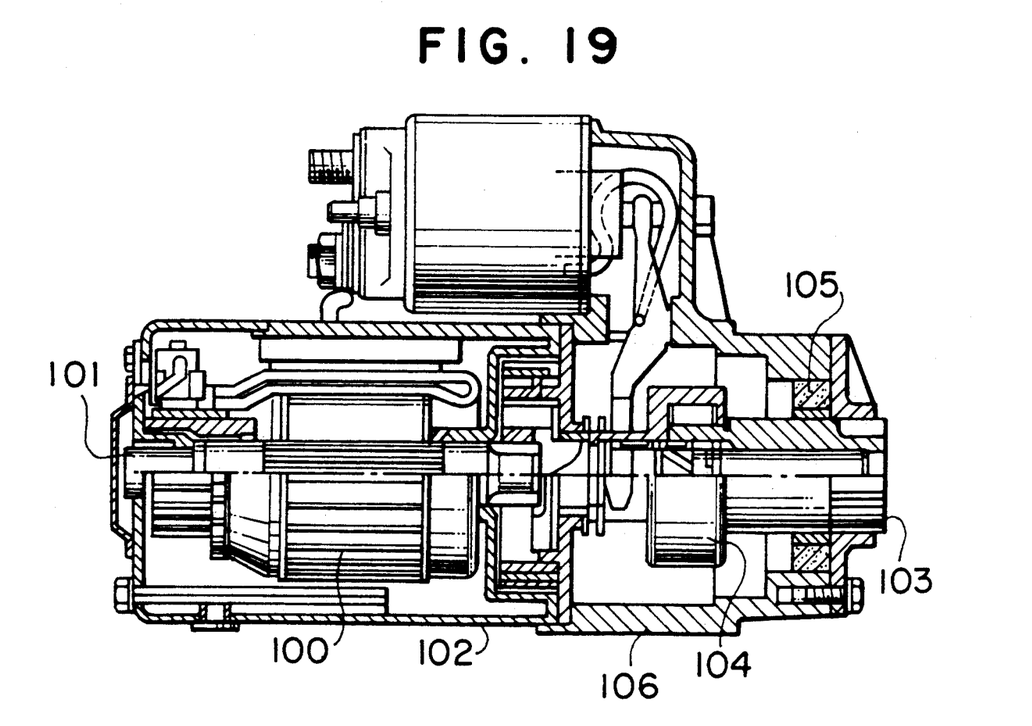
FIG. 19 is a partly-sectioned side elevational view of a starter to which the present invention is applied.

FIG. 19 shows the construction of the starter incorporating the slide bearing device of the present invention.

The motor portion of the starter has a rotor 100 and a stator 102. The rotor 100 has a rotor shaft 101 which is supported at its both ends on the stator 102. A pinion gear 103 for starting the engine is slidably held on the rotor shaft 101 through a roller clutch 104. The outer peripheral portion of the pinion gear 103 is held on the gear case 106 through a slide bearing 105. The slide bearing in turn is press-fit in the gear case 106.

Figure 9:
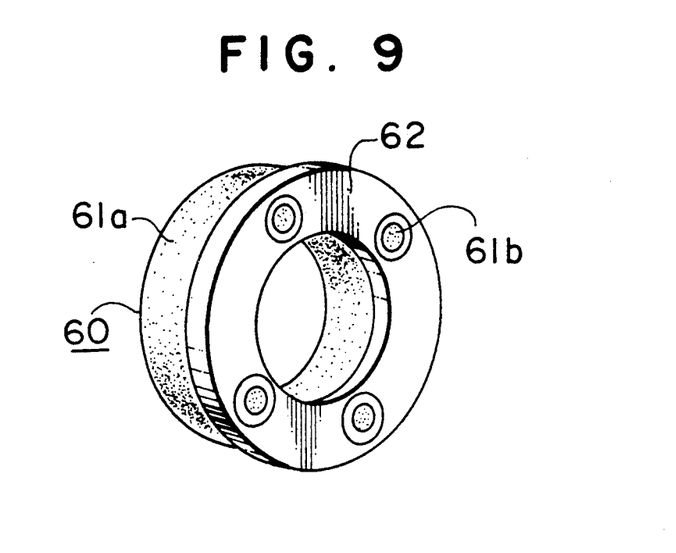
FIG. 9 is a perspective view of a third embodiment.
Figure 10A:
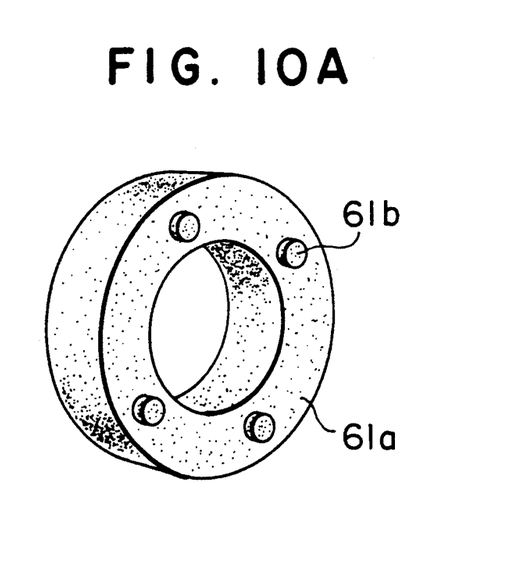
FIGS. 10(A) and 10(B) are perspective views of components of the third embodiment.
Figure 10B:
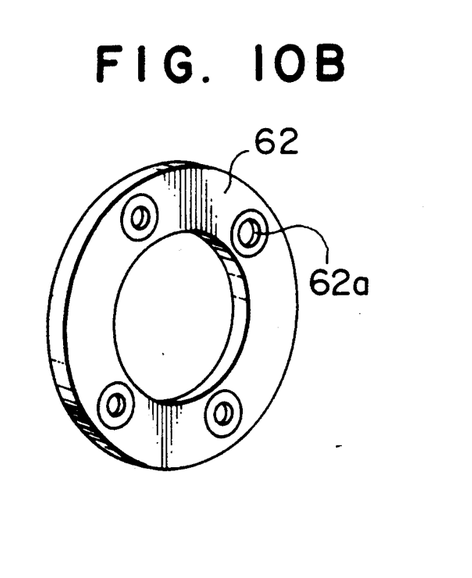

FIGS. 9, 10A and 10B show a slide thrust bearing device 60 as a third embodiment of the slide bearing of the present invention. The slide thrust bearing device 60 has an annular oil-containing sintered member 61a and an annular fixed pad 62 fixed to one side of the oil-containing sintered member 61a. The fixed pad 62 has a size substantially the same as the size of the side surface of the oil-containing sintered member 61a to which the pad 62 is fixed. The fixed pad 62 has conical oil supply ports 62a formed therein at a constant circumferential pitch. The oil-containing sintered member 61a has projections 61b projected from the above-mentioned side surface thereof. In the assembled state of the bearing, these projections 61b fit in corresponding oil-supplying ports 62a formed in the pad 62. The height of the projection 61b is substantially the same as the thickness of the oil supplying ports 62a so that the fixed pad can easily be located with respect to the oil-containing sintered member 61a.

Figure 11:
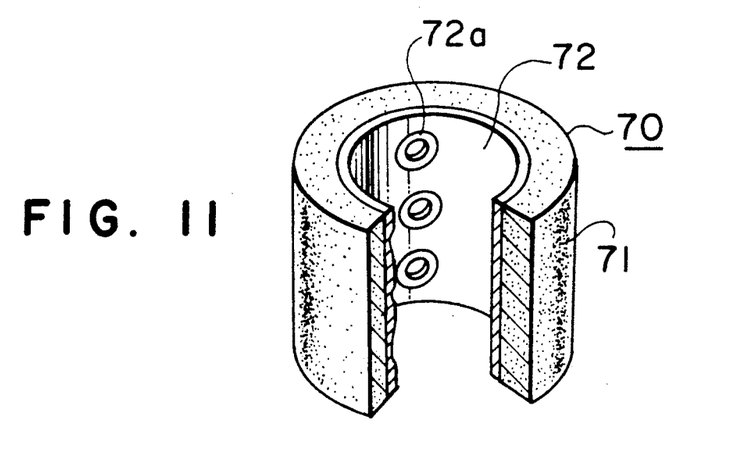
FIG. 11 is a partly-sectioned side elevational view of a fourth embodiment.
Figure 12A:
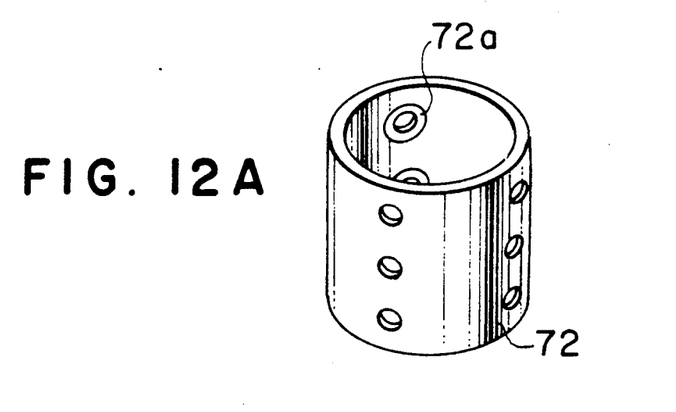
FIGS. 12(A) and 12(B) are perspective views of components of the fourth embodiment.
Figure 12B:
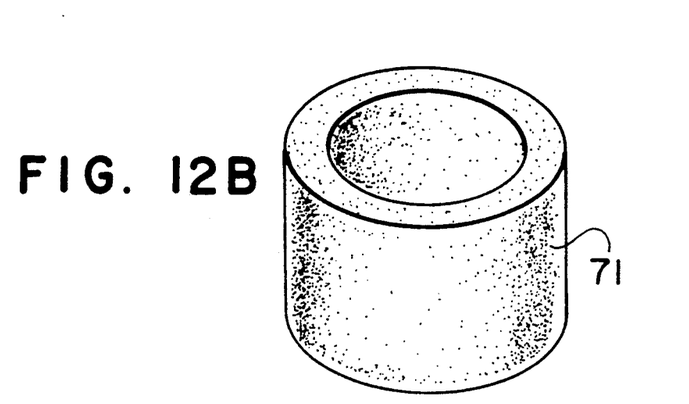

As shown in FIGS. 11, 12A and 12B, a radial bearing device 70 radial bearing device 70 has a cylindrical oil-containing sintered member 71 and a cylindrical fixed pad 72 press-fitted in the oil-containing sintered member 71. As shown in FIG. 12A, the fixed pad 72 has a plurality of conical oil-supplying ports 72a which are arranged in a plurality of axial rows, each row having a plurality of such ports 72a. Although in this embodiment the oil supplying ports 72a are arranged in three rows which are arranged at 120° interval, such number and angular interval are only illustrative and may be varied as necessitated. This applies also to the case of the oil-supplying ports 62a of the thrust-type bearing described in connection with FIGS. 9, 10A and 10B.

Figure 13:
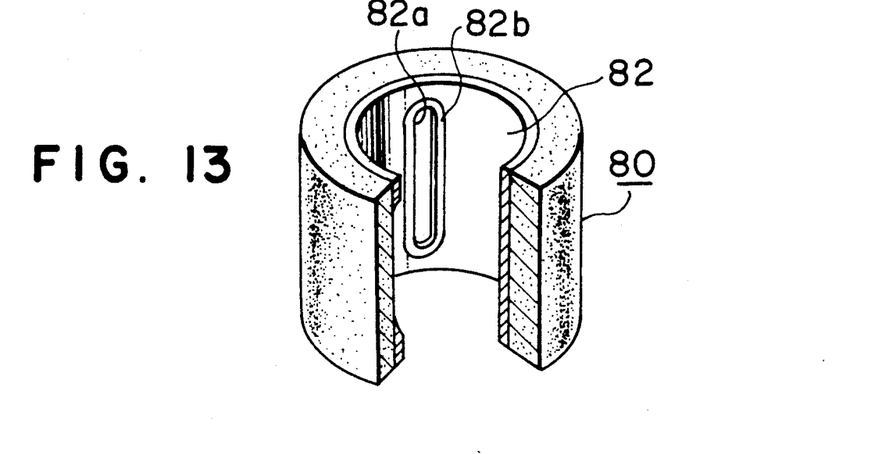
FIG. 13 is a partly-sectioned perspective view of a fifth embodiment.
Figure 14A:
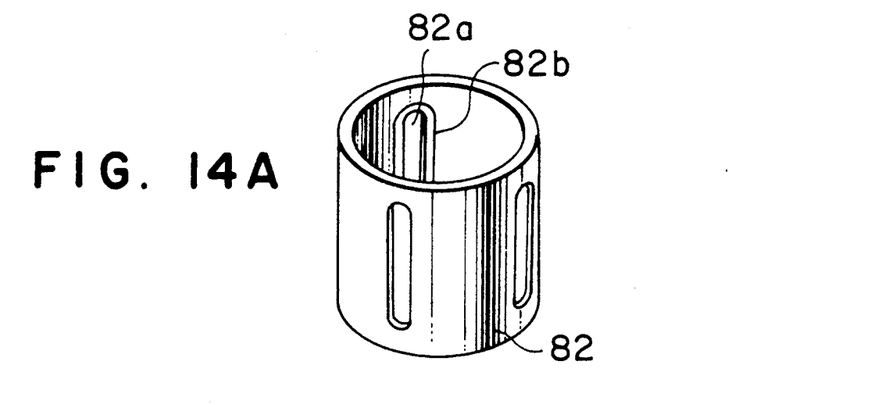
FIGS. 14(A) and 14(B) are perspective views of components of the fifth embodiment.
Figure 14B:
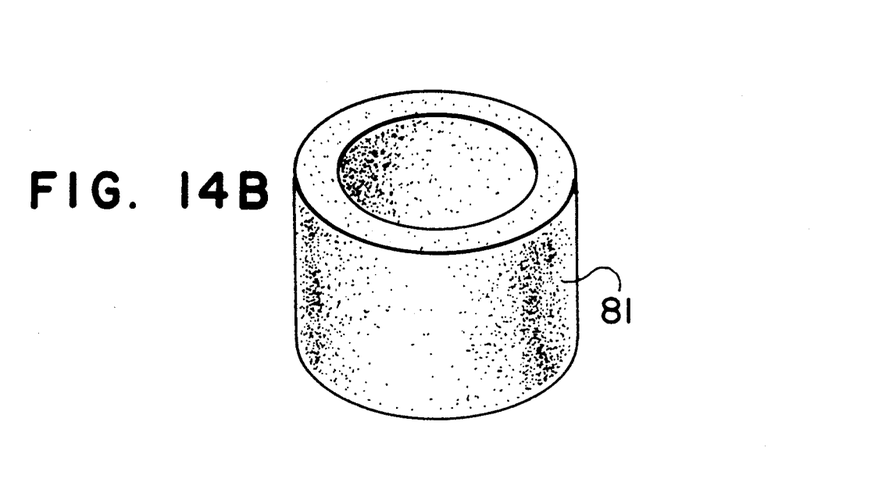

In FIGS. 13, 14A and 14B a radial bearing device 80 includes three substantially rectangular elongated oil-supplying ports 82a formed at 120° interval in a fixed pad 82 which is press-fitted in an oil-containing sintered member 81. Each oil-supplying port 82a has a tapered edge as at 82b. According to this arrangement, it is possible to form large oil-supplying ports comparatively easily.

Figure 15:
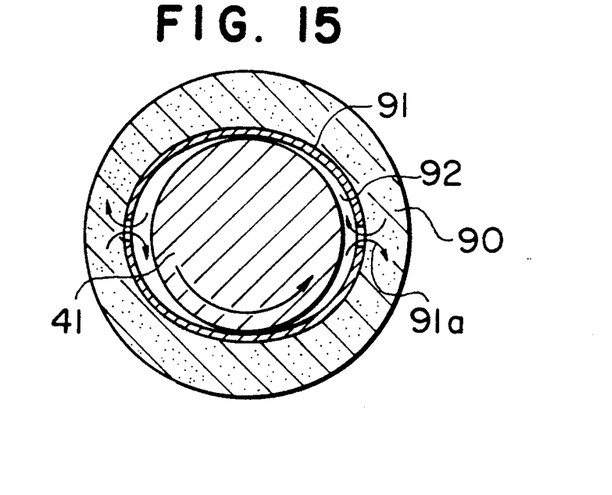
FIGS. 15, 16 and 17 are sectional views of fifth, sixth and seventh embodiments of the present invention.

A radial slide bearing device as shown in FIG. 15 includes an oil-containing sintered member 90 having an oval inner peripheral surface. An oval fixed pad 91 is press-fit in the oil-containing sintered member 90. The fixed pad 91 has a plurality of oil-supplying ports 91a communicating with the oil-containing sintered member 90. Since tapered regions 92 are positively formed between the rotary shaft 41 and edge of each oil-supplying port 91a.

Figure 16:
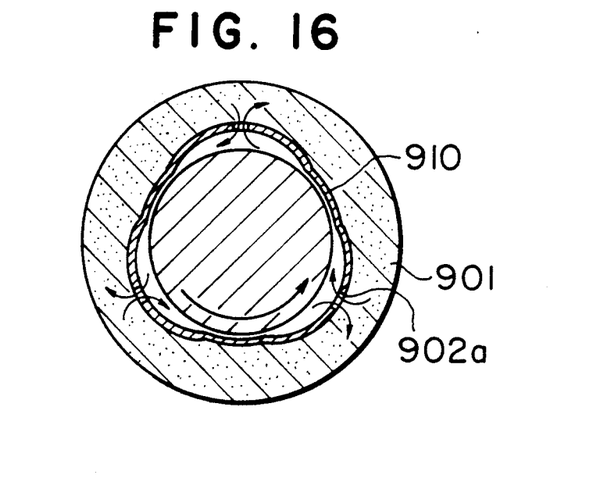

In the embodiments of FIG. 16, an oil-containing sintered member 901 has a substantially triangular inner peripheral surface in which is press-fit a fixed pad 916 having oil-supplying ports 902a. This embodiment offers substantially the same advantage as that offered by the embodiment of FIG. 15.

Figure 17:
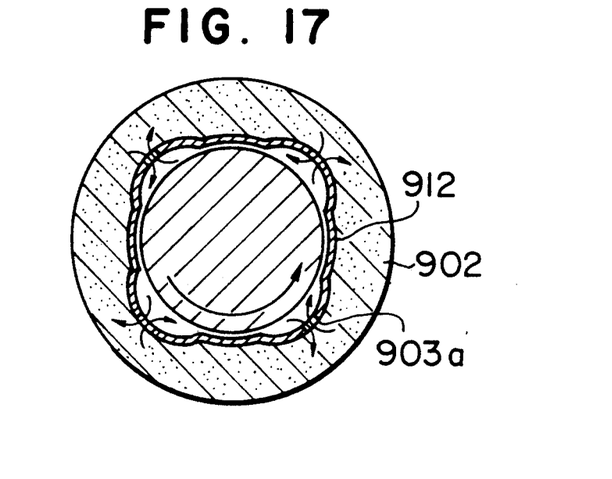

In the embodiment of FIG. 17, an oil-containing sintered member 902 has a substantially square inner peripheral surface in which is press-fit a fixed pad 912 having oil-supplying ports 903a. It will be seen that the number of portions generating dynamic pressure increases as the degree of polygon of the inner peripheral surface of the oil-containing sintered member increases. These polygonal shapes of the inner peripheral surface of the bearing device can be selected as desired.

What is claimed is:

1. A slide bearing device having an oil-containing sintered member, at least one fixed pad fixed to said oil-containing sintered member for supporting a sliding member through an oil film formed therebetween by a lubricating oil supplied from said oil-containing sintered member, at least two oil-supplying ports to enable supply of said lubricating oil from said oil-containing sintered member to a sliding surface of said fixed pad, means for generating a dynamic pressure of said lubricating oil between said fixed pad and said sliding member so as to forcibly form and maintain said oil film between said fixed pad and said sliding member including a tapered region formed on said fixed pad between adjacent oil supplying ports arranged such that the pressure of said oil is progressively increased as said lubricating oil moves in the direction of movement of said sliding member away from each oil supplying port.

2. A slide bearing device according to claim 1, wherein said tapered region is formed on said fixed pads at both sides of each oil-supplying port as viewed in the direction of movement of said sliding member.

3. A slide bearing device having a cylindrical oil-containing sintered member and at least one fixed pad fixed to said oil-containing sintered member, said pad supporting a rotational shaft through an oil film formed therebetween by a lubricating oil supplied from said oil-containing sintered member, said bearing device comprising: at least one oil-supplying port formed in said fixed pad; and a tapered region formed on said fixed pad so as to lead from the edge of said oil-supporting port in such a manner that the pressure of said lubricating oil supplied through said oil-supplying port progressively increases as said lubricating oil moves in the direction of rotation of said rotational shaft away from said oil-supplying port.

4. A slide bearing device according to claim 3, wherein said fixed pad has a cylindrical form and has said oil-supplying port formed therein.

5. A slide bearing device according to claim 4, wherein said sintered member is locally protruded into said oil-supplying port so as to locate said fixed pad.

6. A slide bearing device according to claim 3, wherein said fixed pad includes a plurality of arcuate pad segments and the circumferential gaps between adjacent pad segments provides said oil-supplying ports.

7. A slide bearing device according to claim 6, wherein said sintered member is locally protruded into said oil-supplying ports so as to locate said fixed pad.

8. A slide bearing device according to claim 6, wherein each said oil-supplying ports has a conical form.

9. A slide bearing device according to claim 3, wherein said sintered member is locally protruded into said oil-supplying port so as to locate said fixed pad.

10. A slide bearing device according to claim 4, wherein a plurality of said oil-supporting ports are provided and each said oil-supplying ports has a conical form.

11. A slide bearing device according to claim 3, wherein said oil-containing sintered member is made of ferrous sintered material vacuum-impregnated with said lubricating oil while said fixed pad is made of a wear-resistant material having a high affinity to said sintered member.

12. A slide bearing device having a disk-shaped oil-containing sintered member and at least one fixed pad fixed to said oil-containing sintered member, said pad supporting a sliding member through an oil film formed therebetween by a lubricating oil supplied from said oil-containing sintered member, said bearing device comprising: at least one oil-supplying port formed in said fixed pad; and a tapered region formed on said fixed pad so as to lead from the edge of said oil-supporting port in such a manner that the pressure of said lubricating oil supplied through said oil-supplying port progressively increases as said lubricating oil moves in the direction of movement of said sliding member away from said oil-supplying port.

13. A slide bearing device according to claim 12, wherein said fixed pad has a disk-like form and has said oil-supplying port formed therein.

14. A slide bearing device according to claim 13, wherein said sintered member is locally protruded into said oil-supplying port so as to locate said fixed pad.

15. A slide bearing device according to claim 13, wherein a plurality of said oil-supporting ports are provided and each said oil-supplying ports has a conical form.

16. A slide bearing device according to claim 12, wherein said fixed pad includes a plurality of arcuate pad segments and the circumferential gaps between adjacent pad segments provides said oil-supplying ports.

17. A slide bearing device according to claim 16, wherein said sintered member is locally protruded into said oil-supplying port so as to locate said fixed pad.

18. A slide bearing device according to claim 16, wherein each said oil-supplying ports has a conical form.

19. A slide bearing device according to claim 16, wherein said oil-containing sintered member is made of a ferrous sintered material vacuum-impregnated with said lubricating oil, while said fixed pad is made of a wear-resistant material having a high affinity to said sintered member.

20. Slide bearing device according to claim 12, wherein said oil-containing sintered member is made of a ferrous sintered material vacuum-impregnated with said lubricating oil, while said fixed pad is made of a wear-resistant material having a high affinity to said sintered member.

21. A starter for cranking an internal combustion engine comprising: a motor portion having a rotor shaft; a pinion shaft slidable on said rotor shaft; a gear case surrounding said shaft; and a slide bearing through which said pinion shaft is supported on said gear case; said slide bearing including a cylindrical oil-containing sintered member, and a fixed pad fixed to the inner peripheral surface of said sintered member, said fixed pad having at least one oil-supplying port for supplying a lubricating oil from said oil-containing sintered member to the gap between said fixed pad and said pinion shaft, and a tapered region expending from the edge of said oil-supplying port such that the pressure of said lubricating oil is progressively increased as said lubricating oil moves in the direction of rotation of said pinion shaft away from said oil-supplying port.

* * * * *